US012645614B2

(12) United States Patent
Subramanian

(10) Patent No.: US 12,645,614 B2
(45) Date of Patent: Jun. 2, 2026

(54) TECHNIQUES FOR EFFICIENT PRE-FETCH DATA BUFFER MANAGEMENT BY A MEMORY CONTROLLER

(71) Applicant: NVIDIA CORPORATION, Santa Clara, CA (US)

(72) Inventor: Manikandan Subramanian, Bangalore (IN)

(73) Assignee: NVIDIA CORPORATION, Santa Clara, CA (US)

( * ) Notice: Subject to any disclaimer, the term of this patent is extended or adjusted under 35 U.S.C. 154(b) by 61 days.

(21) Appl. No.: 18/325,794

(22) Filed: May 30, 2023

(65) Prior Publication Data

US 2024/0403238 A1 Dec. 5, 2024

(51) Int. Cl.
*G06F 13/16* (2006.01)
(52) U.S. Cl.
CPC ........ *G06F 13/1673* (2013.01); *G06F 13/161* (2013.01)
(58) Field of Classification Search
None
See application file for complete search history.

(56) References Cited

U.S. PATENT DOCUMENTS 10,664,403 B1 * 5/2020 Lai ...................... G06F 12/0886
11,327,677 B1 * 5/2022 Denolf .................. G06F 3/0659

2009/0158005 A1 * 6/2009 Carmichael ......... G06F 12/0862
                                                              711/213
2010/0281221 A1 * 11/2010 Cantin ................ G06F 12/0813
                                                              711/132
2011/0225370 A1 * 9/2011 So ........................ G06F 12/0246
                                                              711/135
2016/0055107 A1 * 2/2016 Ambroladze ......... G06F 12/084
                                                              710/308
2017/0031828 A1 * 2/2017 Dunlap ............... G06F 12/0877
2018/0316552 A1 * 11/2018 Subramani Nadar ........................
                                                              H04L 41/5045
2020/0081864 A1 * 3/2020 Roberts ............... G06F 13/1673
2020/0320002 A1 * 10/2020 Doddaiah ........... G06F 12/0862
2022/0171546 A1 * 6/2022 Yu ........................... G06F 3/061

* cited by examiner

*Primary Examiner* — Jared I Rutz
*Assistant Examiner* — Alexander J Yoon
(74) *Attorney, Agent, or Firm* — Squire Patton Boggs LLP; Sarah Mirza

(57) ABSTRACT

Various embodiments include techniques for managing pre-fetch data in a computing system. A memory controller receives pre-fetch operations from a pre-fetch generator associated with a processing unit. The pre-fetch operations identify data that is likely to be accessed by the processing unit in the near future. In response, the memory controller retrieves read data associated with the read operations from system memory and stores the read data in a pre-fetch buffer included in the memory controller. The memory controller further receives status data via a low-latency signal path. The status data indicates information about each read operation, such as if the read operation can be serviced by a cache memory and whether the read operation is delayed but is to be transmitted to the memory controller. In response, the memory controller purges data from or holds data in the pre-fetch buffer based on the status data.

18 Claims, 4 Drawing Sheets

TECHNIQUES FOR EFFICIENT PRE-FETCH DATA BUFFER MANAGEMENT BY A MEMORY CONTROLLER

BACKGROUND

Field of the Various Embodiments

Various embodiments relate generally to computing system architectures and, more specifically, to techniques for efficient pre-fetch data buffer management by a memory controller.

Description of the Related Art

A computing system generally includes, among other things, one or more processing units, such as central processing units (CPUs) and/or graphics processing units (GPUs), network adapters, and one or more memory systems. Processing units execute user mode software applications, which submit and launch compute tasks, executing on one or more compute engines included in the processing units. In operation, processing units load data from the one or more memory systems, perform various arithmetic and logical operations on the data, and store data back to the one or more memory systems.

Processing units access data via a hierarchical memory system, including one or more relatively small, high performance cache memory systems and a relatively large, low performance main memory system. In one example, each processing unit includes a small, high-performance level 1 cache memory that stores the data that is most likely to be requested by the processing unit in the immediate future. Each processing unit further includes a somewhat larger, somewhat lower performance level 2 cache memory that stores the data that is likely to be requested by the processing unit in the near future, but not as immediately as the data in the level 1 cache memory. The system includes a system level cache memory that services multiple processing units. The system level cache memory is typically larger and lower performance than the level 2 cache memories. Finally, the system includes a main memory system that is larger and lower in performance than the system level cache memory. When a processing unit requests data from memory, to read data from memory and/or to write data to memory, one or more memory controllers, referred to collectively as "the memory controller," first seeks the data from the level 1 cache memory. If the data is not stored in the level 1 cache memory, then the memory controller next seeks the data from the level 2 cache memory, followed by system level cache memory, and then followed by main memory, with decreasing performance at each step in the hierarchical memory system.

In order to increase performance of such a hierarchical memory system, a pre-fetch generator in the processing unit issues a pre-fetch operation to give an early indication to the memory controller or a hint to downstream components to identify data that is likely needed in the near future. Typically, the pre-fetch operation travels via a different route from the associated read request for the data specified by the pre-fetch operation. This allows the pre-fetch operation to arrive at the memory controller earlier than the read operation issued by the processing unit that requests the data. The pre-fetch operation also bypasses the system level cache memory, in that the pre-fetch operation is directly routed from the pre-fetch generator unit to the memory controller. In response to the pre-fetch operation, the memory controller pre-fetches the data specified by the pre-fetch operation from system memory and stores the data in a pre-fetch buffer. When the processing unit subsequently issues the read operation for the data, the processing unit accesses higher performance pre-fetch buffer memory rather than lower performance system memory. The technique helps to mitigate the long latency of system memory and improves overall memory bandwidth and efficiency.

The read operation issued by the processing is routed via the standard pipeline, passing through local cache memories, the system level cache memory, and the memory controller. Therefore, the read operation could be serviced by a local cache memory and never arrive at the memory controller. Alternatively, the read operation could be serviced by the system level cache memory rather than the pre-fetch buffer. Therefore, the data stored in the pre-fetch buffer of the memory controller may or may not be used for a given read operation. Further, the actual latency difference between when the pre-fetch operation arrives at the memory controller and when the corresponding read operation arrives at the memory controller depends on numerous factors. These factors include latency between when the pre-fetch operation is issued and when the read operation issues, the priority with which pre-fetch operations and read operations are routed after issuance, the relative priority of a read operation relative to read operations and/or write operations issued by other processing units, and the actual memory traffic profile in the computing system as of the time the read operation issues. These factors further include the accuracy of the pre-fetch generator, such as when the pre-fetch generator issues a pre-fetch operation and the processing unit does not subsequently issue a corresponding read operation.

Because of these factors, there is a need to efficiently manage pre-fetch data at the memory controller. In one approach, the memory controller does not store any pre-fetch data in a pre-fetch buffer. This approach reduces the memory requirements in the memory controller and can be efficient if the read operation arrives at the memory controller before the pre-fetch from system memory is complete. However, if the pre-fetch operation completes before the read operation arrives at the memory controller, then the data for the read operation is fetched a second time from system memory. In such cases, system memory bandwidth is wasted, and the pre-fetch does not result in reducing latency or improving memory performance.

In another approach, pre-fetch data is stored in a pre-fetch buffer and purged after a fixed duration of time if the read operation does not arrive at the memory controller before the duration of time expires. This fixed duration of time can be set to a high value, in anticipation of a large latency difference between when the pre-fetch operation and corresponding read operation arrives at the memory controller. However, a high duration of time can lead to poor pre-fetch buffer utilization, such as when the processing unit does not issue the read operation or when the read operation is serviced be a local cache memory or the system level cache memory. As a result, the pre-fetch buffer may not have space to store pre-fetch data for other read operations that may actually be used.

On the other hand, the fixed duration of time can be set to a low value, in anticipation of a small latency difference between the time of the pre-fetch operation and the time of the corresponding read operation to arrive at the memory controller. The fixed duration of time can also be set to a low value to reduce the likelihood of having no space to store pre-fetch data for other read operations that may actually be used. However, as with the case of no pre-fetch buffer, if the stored pre-fetch data is purged before the read operation arrives at the memory controller, then the data for the read operation is fetched a second time from system memory. In such cases, system memory bandwidth is wasted, and the pre-fetch does not result in reducing latency or improving memory performance.

As the foregoing illustrates, what is needed in the art are more effective techniques for managing pre-fetch data in a computing system.

SUMMARY

Various embodiments of the present disclosure set forth a computer-implemented method for managing pre-fetch data in a computing system. The method includes receiving a pre-fetch operation associated with a memory operation. The method further includes retrieving data associated with the memory operation from a system memory. The method further includes storing the data in a pre-fetch buffer. The method further includes receiving status data from a cache memory. The method further includes purging the data from the pre-fetch buffer or holding the data in the pre-fetch buffer based on the status data.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, with the disclosed techniques, a memory controller manages data stored in a pre-fetch buffer using early live indications in the form of status data received from a system level cache memory or other point of coherency. The memory controller uses these indications in addition to pre-fetch operations received from a pre-fetch generator. As a result, the memory controller can purge data stored in the pre-fetch buffer earlier when the indications indicate that the read operation can be serviced by a local cache memory or system level cache memory. The memory controller can hold data stored in the pre-fetch buffer longer when the indications indicate that the read operation is delayed and/or cannot be serviced by a local cache memory or system level cache memory. Therefore, the pre-fetch buffer can purge data sooner when the data is not needed and hold data longer when the data is needed, relative to prior approaches. As a result, the memory controller manages the pre-fetch buffer more efficiently and the memory system achieves higher performance relative to prior techniques. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
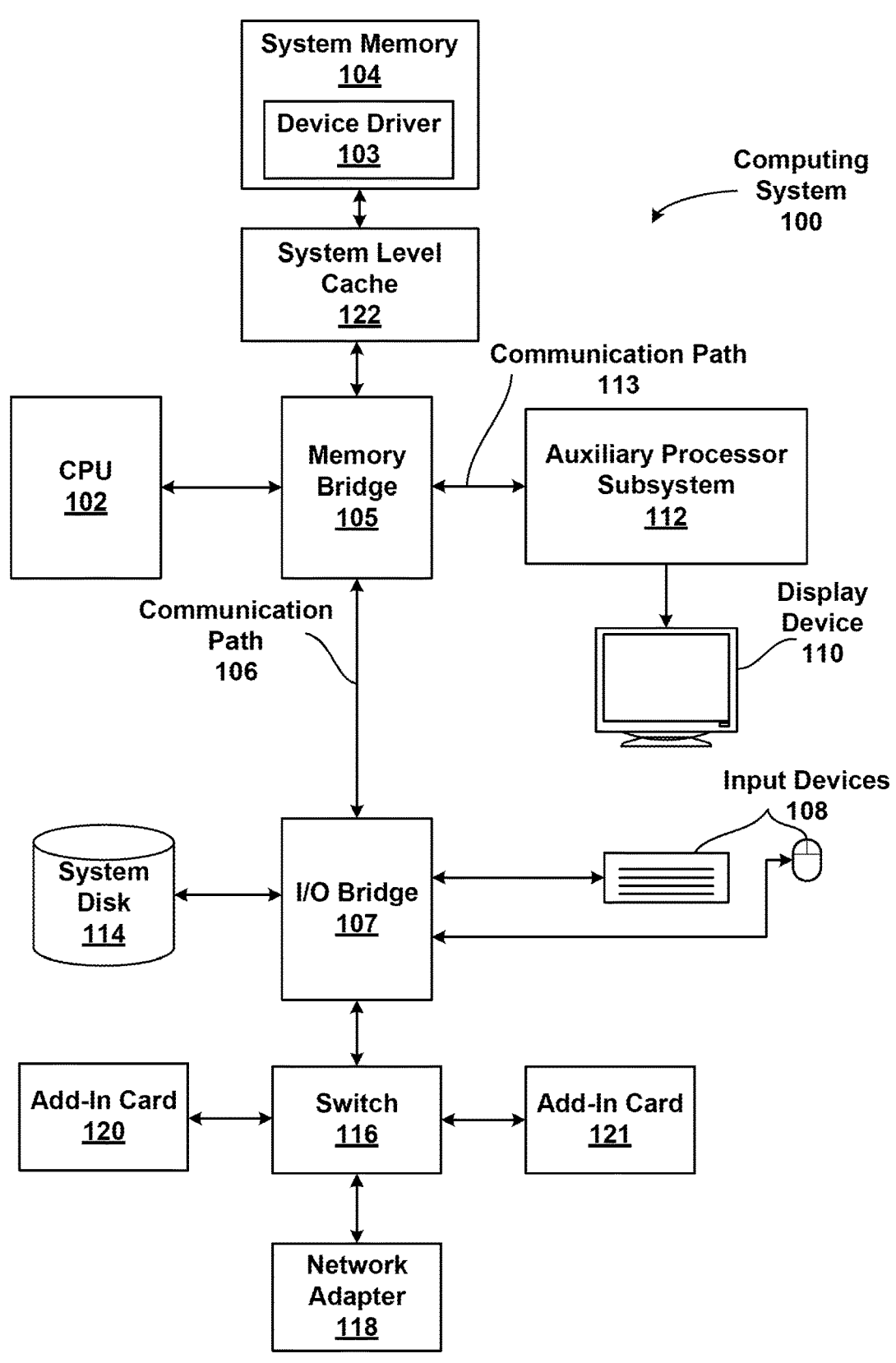
FIG. 1 is a block diagram of a computing system configured to implement one or more aspects of the various embodiments.

FIG. 1 is a block diagram of a computing system 100 configured to implement one or more aspects of the various embodiments. As shown, computing system 100 includes, without limitation, a central processing unit (CPU) 102, a system level cache memory (SLC) 122, and a system memory 104 coupled to an auxiliary processor subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computing system 100 to authorized users and deny access of computing system 100 to unauthorized users. Switch 116 is configured to provide connections between I/O bridge 107 and other components of the computing system 100, such as a network adapter 118 and various add-in cards 120 and 121.

As also shown, I/O bridge 107 is coupled to a system disk 114 that can be configured to store content and applications and data for use by CPU 102 and auxiliary processor subsystem 112. As a general matter, system disk 114 provides non-volatile storage for applications and data and can include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, can be connected to I/O bridge 107 as well.

In various embodiments, memory bridge 105 can be a Northbridge chip, and I/O bridge 107 can be a Southbridge chip. In addition, communication paths 106 and 113, as well as other communication paths within computing system 100, can be implemented using any technically suitable protocols, including, without limitation, Peripheral Component Interconnect Express (PCIe), HyperTransport, or any other bus or point-to-point communication protocol known in the art.

In some embodiments, auxiliary processor subsystem 112 comprises a graphics subsystem that delivers pixels to a display device 110 that can be any conventional cathode ray tube, liquid crystal display, light-emitting diode display, or the like. In such embodiments, the auxiliary processor subsystem 112 incorporates circuitry optimized for graphics and video processing, including, for example, video output circuitry. Such circuitry can be incorporated across one or more auxiliary processors included within auxiliary processor subsystem 112. An auxiliary processor includes any one or more processing units that can execute instructions such as a central processing unit (CPU), an auxiliary processor included in auxiliary processor subsystem 112, a graphics processing unit (GPU), a direct memory access (DMA) unit, an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, auxiliary processor subsystem 112 incorporates circuitry optimized for general purpose and/or compute processing. Such circuitry can be incorporated across one or more auxiliary processors included within auxiliary processor subsystem 112 that are configured to perform such general purpose and/or compute operations. In yet other embodiments, the one or more auxiliary processors included within auxiliary processor subsystem 112 can be configured to perform graphics processing, general purpose processing, and compute processing operations. System memory 104 includes at least one device driver 103 configured to manage the processing operations of the one or more auxiliary processors within auxiliary processor subsystem 112.

In various embodiments, auxiliary processor subsystem 112 can be integrated with one or more other elements of FIG. 1 to form a single system. For example, auxiliary processor subsystem 112 can be integrated with CPU 102 and other connection circuitry on a single chip to form a system on chip (SoC).

In operation, CPU 102 is the master processor of computing system 100, controlling and coordinating operations of other system components. In particular, CPU 102 issues commands that control the operation of auxiliary processors within auxiliary processor subsystem 112. In some embodiments, CPU 102 writes a stream of commands for auxiliary processors within auxiliary processor subsystem 112 to a data structure (not explicitly shown in FIG. 1) that can be located in system memory 104, PP memory 134, or another storage location accessible to both CPU 102 and the auxiliary processors. A pointer to the data structure is written to a pushbuffer to initiate processing of the stream of commands in the data structure. The auxiliary processor reads command streams from the pushbuffer and then executes commands asynchronously relative to the operation of CPU 102. In embodiments where multiple pushbuffers are generated, execution priorities can be specified for each pushbuffer by an application program via device driver 103 to control scheduling of the different pushbuffers.

System level cache memory 122 is a last-level-cache, memory-side-cache. System level cache memory 122 maintains hardware coherency between various coherent SLC clients in computing system 100, including CPU 102, auxiliary processor subsystem 112, network adapter 118, and/or the like. System level cache memory 122 is a cache memory that serves as an extension of system memory 104. System level cache memory 122 exhibits low access latency relative to system memory 104. System level cache memory 122 acts as a point of coherency, in that traffic between various SLC clients and system memory 104 passes through system level cache memory 122. System level cache is managed by a memory controller (not shown in FIG. 1) as described in conjunction with FIG. 2.

In various embodiments, auxiliary processor subsystem 112 can be integrated with one or more other the other elements of FIG. 1 to form a single system. For example, auxiliary processor subsystem 112 can be integrated with CPU 102 and other connection circuitry on a single chip to form a system on chip (SoC).

It will be appreciated that the system shown herein is illustrative and that variations and modifications are possible. Among other things, any number of processing units, such as CPUs 102 or auxiliary processor subsystems 112, can be included within computing system 100. The connection topology, including the number and arrangement of bridges, the number of CPUs 102, and the number of auxiliary processor subsystems 112, can be modified as desired. For example, in some embodiments, system memory 104 could be connected to CPU 102 directly rather than through memory bridge 105, and other devices would communicate with system memory 104 via memory bridge 105 and CPU 102. In other alternative topologies, auxiliary processor subsystem 112 can be connected to I/O bridge 107 or directly to CPU 102, rather than to memory bridge 105. In still other embodiments, I/O bridge 107 and memory bridge 105 can be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107. In view of the foregoing, persons of ordinary skill in the art will appreciate that the architecture described in FIG. 1 in no way limits the scope of the various embodiments of the present disclosure.

Please note, as used herein, references to shared memory can include any one or more technically feasible memories, including, without limitation, a local memory shared by one or more CPUs 102 or auxiliary processor subsystems 112, or a memory accessible via the memory bridge 105, such as a system level cache memory 122, system memory 104, and/or other memory. Please also note, as used herein, references to cache memory may include any one or more technically feasible memories, including, without limitation, L1 cache memories, L1.5 cache memories, L2 cache memories, system level cache memories, and/or the like.

Managing Pre-Fetch Data Using Status Data from a System Level Cache Memory

Various embodiments include techniques for managing pre-fetch data in a computing system. With the disclosed techniques, a memory controller receives early, live status data indicating the status of read operations likely to be issued by one or more processing units. As used herein, live status data refers to status data that arrives at the memory controller concurrently, or shortly after, the status data is generated by a system level cache memory or other point of coherency. For example, the live status data can arrive at the memory controller within 1 to 2 clock cycles after the system level cache memory or other point of coherency generates the live status data. By contrast, a memory operation corresponding to the status data can arrive at the memory controller 10 to 15 clock cycles, or more, after the read operation is transmitted by the system level cache memory or other point of coherency. As a result, the memory controller receives the live status data well before receiving the corresponding memory operation.

As used herein, a point of coherency is any point in a computing system where all CPUs 102 or auxiliary processor subsystems 112, streaming engines, direct memory access (DMA) engines, and/or other clients that can access data from memory are able to access the same copy of a particular area of the memory. The point of coherency can include standalone logic, a portion of logic within a system level cache memory, the system level cache memory itself, and/or the like. With regard to accessing data from memory, references to the system level cache memory can additionally or alternatively refer to any technically feasible point of coherency.

The status data does not pass through the same pipeline as the subsequent read operation when the read operation is transmitted to the memory controller. Instead, the status data is routed from the system level cache memory or other point of coherency to the memory controller via one or more side band signals. These side band signals have a latency of a small number of clock cycles, such as one clock cycle, between when the system level cache memory or other point of coherency detects a change in status and when the memory controller receives the status data.

The status data indicates status regarding the likelihood of such read operations arriving at the memory controller and the processing of the read operations by the system level cache memory. Additionally or alternatively, the status data indicates status regarding the processing of the read operations by another point of coherency, such as a component that is upstream relative to the system level cache memory. The memory controller utilizes the status data to efficiently purge pre-fetch data from or hold pre-fetch data in the pre-fetch buffer. The status data indicates when a read operation for a given cache line has arrived at the system level cache memory or other point of coherency. The status data further indicates if a read operation is being retried at the system level cache memory or other point of coherency. The status data further indicates if a read operation is issued by the processing unit and the corresponding cache line is stored in the system level cache memory or other cache memory in a dirty state. The other cache memory can be any coherent cache memory, including a level 1 or level 2 cache memory associated with the requesting processing unit, a level 1 or level 2 cache memory associated with a different processing unit, and/or the like. In such cases, the read operation is serviced by the system level cache memory or other cache memory and does not arrive at the memory controller. The status data further indicates if a read operation is issued by the processing unit and the corresponding cache line is stored in the system level cache memory or other cache memory in a clean state. The other cache memory can be any coherent cache memory, including a level 1 or level 2 cache memory associated with the requesting processing unit, a level 1 or level 2 cache memory associated with a different processing unit, and/or the like. In such cases, depending on the behavior and cache policy of the system level cache memory or other cache memory, the memory controller can determine whether or not to purge the data stored in the pre-fetch buffer.

Figure 2:
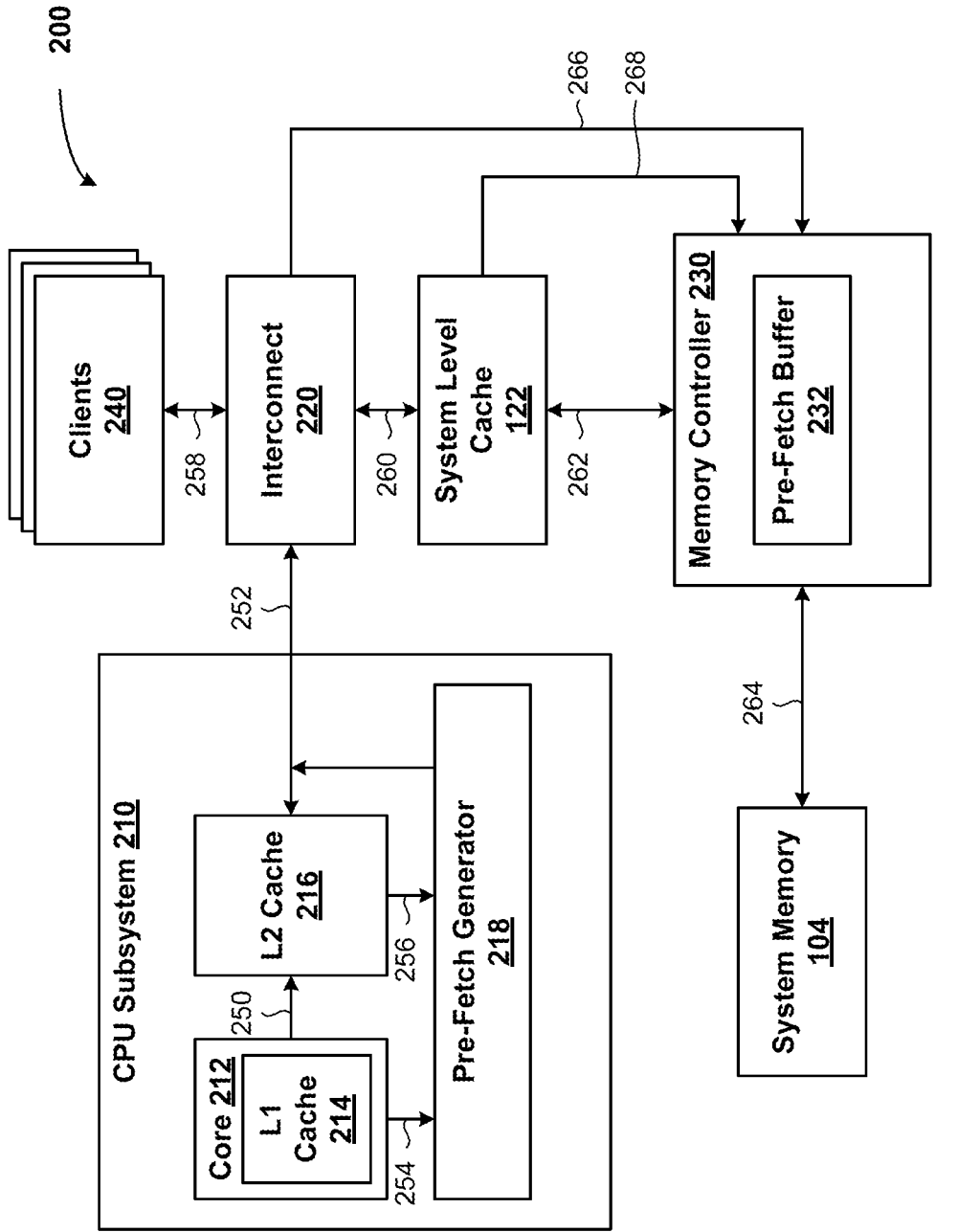
FIG. 2 is a block diagram of a pre-fetch system for the computing system of FIG. 1, according to various embodiments.

FIG. 2 is a block diagram of a pre-fetch system 200 for the computing system of FIG. 1, according to various embodiments. The pre-fetch system 200 includes, without limitation, a CPU subsystem 210 and other clients 240 that connect to other components of the pre-fetch system 200 through an interconnect 220. These other components include, without limitation, a system level cache memory 122, a memory controller 230, and system memory 104. Memory controller 230 includes, without limitation, a pre-fetch buffer 232.

CPU subsystem 210 includes, without limitation, a core 212 that further includes a level 1 (L1) cache memory 214. The CPU subsystem 210 includes, without limitation, a level 2 (L2) cache memory 216, and a pre-fetch generator 218. The core 212 can include any one or more processing units or portions thereof, such as one or more CPUs 102, one or more auxiliary processor subsystems 112, and/or the like. Further, the CPU subsystem 210 can include multiple cores in addition to core 212.

When executing computer programs, processing units included in core 212 issue memory operations, including read operations and write operations. The processing units issue read operations to read data from memory and issue write operations to store data to memory. The processing units access data via a hierarchical memory system, including one or more relatively small, high performance cache memory systems and a relatively large, low performance main memory system. In that regard, when issuing a memory operation, a processing unit within core 212 first attempts to access the data associated with the memory operation from a level 1 cache memory (L1 cache) 214. Level 1 cache memory 214 is a small, high-performance cache memory that stores the data that is most likely to be requested by the processing unit in the immediate future. If the data associated with the memory operation is not available in level 1 cache memory 214, then the processing unit attempts to access the data associated with the memory operation from a level 2 cache memory (L2 cache) 216 using data path 250. Level 2 cache memory 216 is, relative to level 1 cache memory 214, a somewhat larger, somewhat lower performance cache memory that stores the data that is likely to be requested by the processing unit in the near future, but not as immediately as the data in the level 1 cache memory. If the data associated with the memory operation is not available in level 1 cache memory 214 or in level 2 cache memory 216, then the processing unit transmits the memory operation to interconnect 220 using data path 252.

Interconnect 220 receives memory operations, using data path 252, from processing units on CPU subsystem 210 where the data is not available in level 1 cache memory 214 or in level 2 cache memory 216. Interconnect 220 also receives memory operations from processing units on other clients 240, using data path 258, where the data is not available in one or more cache memories included in those clients 240. Upon receiving a memory operation from a processing unit on CPU subsystem 210 or from a processing unit on one of the other clients 240, interconnect 220 attempts to access the data associated with the memory operation from system level cache memory 122 using data path 260.

System level cache memory 122 services multiple processing units. System level cache memory 122 is typically larger and lower performance than level 2 cache memory 216. If the data associated with the memory operation is not available in system level cache memory 122, then system level cache memory 122 transmits the memory operation to memory controller 230 using data path 262.

Concurrent with processing units in core 212 issuing memory operations, pre-fetch generator 218 issues pre-fetch operations and transmits the pre-fetch operations to interconnect 220 using data path 252. The pre-fetch operations provide early indication of the data that is likely to be needed in the near future and, therefore, are likely to be requested by memory operations issued by processing units in core 212 in the near future. Pre-fetch generator 218 predicts the data that is likely to be needed based on various factors. To generate such predictions, pre-fetch generator 218 communicates with core 212 and level 1 cache memory 214 using data path 254 and communicates with level 2 cache memory 216 using data path 256. Pre-fetch generator 218 predicts the data that is likely to be needed based on various factors. In some examples, pre-fetch generator 218 predicts the data that is likely to be needed based on a pattern of prior memory operations issued by the processing units. In various applications, a processing unit can issue a series of memory operations to sequentially increasing memory addresses. In such cases, pre-fetch generator 218 predicts that the processing unit is likely to continue to issue memory operations to sequentially increasing memory addresses. In response, pre-fetch generator 218 issues pre-fetch operations requesting that data at these predicted sequentially increasing memory addresses be pre-fetched.

Similarly, a processing unit can issue a series of memory operations to sequentially decreasing memory addresses, at regular memory address intervals, and/or other predictable memory address patterns. In response, pre-fetch generator 218 detects the memory address pattern and predicts that the processing unit is likely to continue to issue memory operations to memory addresses according to the detected memory address pattern. In response, pre-fetch generator 218 issues pre-fetch operations requesting that data from memory addresses according to the detected memory address pattern. Further, a processing unit executes instructions included in application programs. The instructions include memory operations that retrieve data from memory and write operations that store data in memory. Pre-fetch generator 218 can access the instructions included in the application programs to predict what memory addresses are likely to be requested based on memory operations included in the instructions. In response, pre-fetch generator 218 can issue pre-fetch operations requesting that data from memory addresses based on the instructions included in the application programs. Additionally or alternatively, pre-fetch generator 218 can issue pre-fetch operations according to any technically feasible techniques.

In addition to pre-fetch generator 218 on CPU subsystem 210, one or more of the other clients 240 also include pre-fetch generators (not shown). Pre-fetch generators on the other clients 240 issue pre-fetch operations and transmit the pre-fetch operations to interconnect 220 using data path 258. Therefore, interconnect 220 receives memory operations from CPU subsystem 210, memory operations from other clients 240, pre-fetch operations from CPU subsystem 210, and pre-fetch operations from other clients 240. Interconnect 220 can receive these operations in any order, based on processing capacity of CPU subsystem 210, processing capacity of other clients 240, network traffic, and/or the like.

Upon receiving memory operations from processing units on CPU subsystem 210 and/or memory operations from processing units on other clients 240, interconnect 220 forwards the memory operations to system level cache memory 122 using data path 260. Upon receiving pre-fetch operations from pre-fetch generator 218 on CPU subsystem 210 and/or pre-fetch generators on other clients 240, interconnect 220 forwards the pre-fetch operations to memory controller 230 using data path 266, which is separate from data path 260. As a result, memory controller 230 can receive pre-fetch operations from interconnect 220 prior to receiving corresponding memory operations from system level cache memory 122. When memory controller 230 receives a pre-fetch operation from interconnect 220, memory controller 230 pre-fetches the associated data from system memory 104 using data path 264 and stores the pre-fetch data in an entry of the pre-fetch buffer 232. In some examples, each entry in pre-fetch buffer 232 corresponds to a cache line in system level cache memory 122. Pre-fetch buffer 232 is a small, high-performance buffer memory that stores data that is most likely to be requested by a memory operation received from system level cache memory 122 in the near future.

If memory controller 230 subsequently receives the corresponding memory operation, and if the associated data is stored in pre-fetch buffer 232, then memory controller 230 retrieves the data from high-performance pre-fetch buffer 232 rather than low-performance system memory 104. Memory controller 230 transmits the data retrieved from pre-fetch buffer 232 to system level cache memory 122 using data path 262. In such cases, the memory operation is not delayed by the latency of system memory 104. Alternatively, if memory controller 230 subsequently receives the corresponding memory operation, and if the corresponding pre-fetch operation is in progress, then the associated data is not stored in pre-fetch buffer 232. When the pre-fetch operation completes, memory controller 230 transmits the data retrieved from system memory 104 to system level cache memory 122 using data path 262. In such cases, the memory operation is delayed by a portion of the latency of system memory 104. Alternatively, if memory controller 230 subsequently receives the corresponding memory operation, and if the corresponding pre-fetch operation is not in progress, then the associated data is not stored in pre-fetch buffer 232. Memory controller 230 transmits the memory operation to system memory 104 using data path 264 in order to retrieve the data from system memory 104. Memory controller 230 transmits the data retrieved from system memory 104 to system level cache memory 122 using data path 262. In such cases, the memory operation is delayed by the full latency of system memory 104. Alternatively, the processing unit in CPU subsystem 210 or other client 240 may not issue the subsequent memory operation, and, therefore, memory controller 230 does not receive the memory operation for the data.

Pre-fetch buffer 232 includes a buffer purge counter, referred to herein as a counter, for each entry stored in pre-fetch buffer 232. When storing pre-fetch data in pre-fetch buffer 232, memory controller 230 initializes, or resets, the corresponding counter. The counter measures an amount of time, referred to herein as a wait time, that the data stored in the corresponding entry has been resident in pre-fetch buffer. The counter can be initialized with a predetermined value and decremented periodically. The counter expires if the counter is decremented to zero. Alternatively, the counter can be initialized to zero and incremented periodically. The counter expires if the counter is incremented to a predetermined value. If the counter expires, and the data stored in the corresponding entry of pre-fetch buffer 232 has not yet been retrieved in response to a memory operation, then memory controller 230 can purge the data and clear the entry.

In some examples, the predetermined value is stored in a programmable register. In such examples, an application program can determine an appropriate predetermined value via empirical methods. To aid in determining the predetermined value, in some examples, memory controller 230 maintains two additional counters: a pre-fetch operation counter and a pre-fetch service counter. The application program can transmit a command to memory controller 230 to initialize these counters. In response, memory controller 230 initializes the pre-fetch operation counter and the pre-fetch service counter to an initial value, such as zero. When memory controller 230 receives a pre-fetch operation from the from interconnect 220, memory controller 230 increments the pre-fetch operation counter. When memory controller 230 responds to a memory operation by transmitting data stored in an entry of pre-fetch buffer 232, memory controller 230 increments the pre-fetch service counter.

Subsequently, the application program can access the values stored in the two counters to determine the number of pre-fetch operations received by memory controller 230 and the number of memory operations serviced by pre-fetch buffer 232. The application program can determine a service ratio by dividing the number of memory operations serviced by pre-fetch buffer 232 by the number of pre-fetch operations received by memory controller 230. If the service ratio is relatively low compared to a target ratio, then the application program can determine that data stored in pre-fetch buffer 232 is discarded too soon, which can indicate inefficient use of system memory 104 bandwidth. In response, the application program can increase the predetermined value used to initialize the buffer purge counters. Increasing the predetermined value used to initialize the buffer purge counters can increase the service ratio to be closer to the target ratio. Similarly, if the service ratio is relatively high compared to a target ratio, then the application program can determine that data stored in pre-fetch buffer 232 is discarded too late, which can indicate inefficient use of the memory in pre-fetch buffer 232. In response, the application program can decrease the predetermined value used to initialize the buffer purge counters. Decreasing the predetermined value used to initialize the buffer purge counters can decrease the service ratio to be closer to the target ratio.

In addition to receiving pre-fetch operations from interconnect 220, memory controller 230 receives status data from system level cache memory 122 using data path 268. The status data provides early, live indication of memory operations being processed by system level cache memory 122, by other components upstream of system level cache memory 122, and/or by any other points of coherency included in pre-fetch system 200. The status data includes a memory address that identifies the location of data retrieved, or in the process of being retrieved, by a particular memory operation. In some examples, memory controller 230 could have previously received a pre-fetch operation directed to the same memory address line that the current memory operation is being issued to. The status data includes various status parameters that notify memory controller 230 of the progress of the corresponding memory operation. Memory controller 230 uses the memory address included with the status data to identify a corresponding entry in pre-fetch buffer 232.

The status data further includes various parameters associated with the memory operation, if any, for the corresponding memory address. Memory controller 230 uses the status data to determine the likelihood that the data stored in the entry in pre-fetch buffer 232 operations is about to be requested by a memory operation received from system level cache memory 122. Based on the status data, memory controller 230 can purge data for an entry of pre-fetch buffer 232 before the corresponding counter expires or hold data for an entry of pre-fetch buffer 232 after the corresponding counter expires.

System level cache memory 122 transmits the status data to memory controller 230 using a high-speed, low-latency data path 268 that is separate from the data path 262 over which system level cache memory 122 transmits memory operations to memory controller 230. As a result, memory controller 230 typically receives status data for a memory operation prior to receiving the memory operation itself.

The status data can include data that identifies when a read operation directed to a particular cache line has arrived at system level cache memory 122 or other suitable point of coherency. The status data can further include data that identifies when a read operation directed to a particular cache line is being retried at system level cache memory 122 or other point of coherency. The status data can further include data that identifies if a read operation has been issued by the processing unit and the corresponding cache line is stored in system level cache memory 122 or other cache memory in a dirty state. The other cache memory can be any coherent cache memory, including level 1 cache memory 214, level 2 cache memory 216, a level 1 or level 2 cache memory associated with a different processing unit, and/or the like. In such cases, the read operation is serviced by system level cache memory 122 or other cache memory and does not arrive at memory controller 230. The status data status data can further include data that identifies if a read operation is issued by the processing unit and the corresponding cache line is stored in system level cache memory 122 or other cache memory in a clean state. The other cache memory can be any coherent cache memory, including level 1 cache memory 214, level 2 cache memory 216, a level 1 or level 2 cache memory associated with a different processing unit, and/or the like. In such cases, depending on the behavior and cache policy of system level cache memory 122 or other cache memory, memory controller 230 can determine whether or not to purge the corresponding data stored in pre-fetch buffer 232.

In response to receiving certain status data, memory controller 230 can alter the behavior of the counter corresponding to the memory address included in the status data, such as by resetting the counter to the initial value (ceiling value), by resetting the counter to the final value indicating that the counter has expired (floor value), or by holding the current value in the counter without further incrementing or decrementing the counter (static value). By altering the behavior of the counter, memory controller 230 can hold the pre-fetch data in pre-fetch buffer 232 to account for varying latency of when memory controller 230 receives a memory operation from system level cache memory 122 and varying latency of when memory controller 230 transmits the corresponding data to system level cache memory 122. The varying latency can be static and/or dynamic. The varying latency can depend on a current profile of network traffic between system level cache memory 122, interconnect 220, CPU subsystem 210, and other clients 240. The varying latency can further depend on relative priority of memory operations received from CPU subsystem 210 and/or other clients 240, quality of service requirements for memory operations received from CPU subsystem 210 and/or other clients 240.

In some examples, based on the status data, memory controller 230 can determine that a memory operation for a particular cache line is still anticipated to arrive at memory controller 230. For example, if the status data indicates that a read operation has arrived at system level cache memory 122 or other point of coherency, then memory controller 230 can determine that the processing unit has issued a read operation. Similarly, if the status data indicates that a read operation is being retried at system level cache memory 122 or other point of coherency, then memory controller 230 can also determine that the processing unit has issued a read operation. In either case, memory controller 230 does not yet have sufficient data to determine whether the memory operation is going to be serviced by memory controller 230 or by another cache memory in pre-fetch system 200. As a result, memory controller 230 resets the counter for the entry in pre-fetch buffer 232 corresponding to the cache line to the ceiling value. The counter begins counting from the ceiling value, thereby causing the entry to be retained for a longer duration, pending the possibility that system level cache memory 122 could transmit the read operation to memory controller 230.

In some examples, based on the status data, memory controller 230 can determine that a memory operation for a particular cache line is going to arrive at memory controller 230. For example, if the status data indicates that a read operation has arrived at system level cache memory 122 or other point of coherency, and that the requested data is not stored in level 1 cache memory 214, level 2 cache memory 216, system level cache memory 122, or other cache memory, then memory controller 230 determines that the data for the memory operation is stored in system memory 104. The other cache memory can be any coherent cache memory, including level 1 cache memory 214, level 2 cache memory 216, a level 1 or level 2 cache memory associated with a different processing unit, and/or the like. Memory controller 230 sets the counter for the entry in pre-fetch buffer 232 to a static value in order to hold the current counter value without further incrementing or decrementing the counter. As a result, memory controller 230 causes the entry to be retained or kept indefinitely, pending the system level cache memory 122 transmitting the read operation to memory controller 230.

In some examples, based on the status data, memory controller 230 can determine that a memory operation for a particular cache line is not going to arrive at memory controller 230. For example, if the status data indicates that a read operation has arrived at system level cache memory 122 or other point of coherency, and that the requested data is stored in level 1 cache memory 214, level 2 cache memory 216, system level cache memory 122, or other cache memory, then memory controller 230 determines that the read operation is going to be serviced upstream from memory controller 230. The other cache memory can be any coherent cache memory, including level 1 cache memory 214, level 2 cache memory 216, a level 1 or level 2 cache memory associated with a different processing unit, and/or the like. In such cases, memory controller 230 determines that system level cache memory 122 is not going to transmit the read operation to memory controller 230. Therefore, the data in the corresponding entry of pre-fetch buffer 232 is not needed. Memory controller 230 sets the counter for the entry in pre-fetch buffer 232 to the floor value, indicating that the counter has expired. As a result, memory controller 230 causes the entry to be purged.

In some examples, memory controller 230 receives a pre-fetch operation and does not receive any status data regarding the corresponding memory operation. Such examples can occur if pre-fetch generator 218 incorrectly predicted which cache lines would be needed by processing units included in core 212. Therefore, pre-fetch generator 218 issues pre-fetch operations for one or more cache lines, but the processing units included in core 212 do not issue corresponding memory operations. Correspondingly, system level cache memory 122 does not receive any corresponding memory operations from the processing units via interconnect 220. Memory controller 230 continues to increment or decrement the counter until the counter expires. When the counter expires, memory controller 230 purges the data stored in the corresponding entry of pre-fetch buffer 232 and clears the entry.

With these described techniques, memory controller 230 can hold data for longer periods of time if the status data indicates that a corresponding memory operation is still anticipated to arrive. Memory controller 230 can retain or keep data for indefinitely if the status data indicates that a corresponding memory operation is going to arrive. Memory controller 230 can purge data if the status data indicates that a corresponding memory operation is not going to arrive. And memory controller 230 can purge data if no status data is received before a corresponding buffer purge counter has expired.

It will be appreciated that the system shown herein is illustrative and that variations and modifications are possible. The techniques described herein are in the context of a CPU 102 and/or an auxiliary processor subsystem 112, and/or the like. Additionally or alternatively, the techniques described herein can be performed by one or more processing units including, without limitation, CPUs, GPUs, DMA units, IPUs, NPUs, TPUs, NNPs, DPUs, VPUs, ASICs, FPGAs, and/or the like, in any combination. Further, the techniques described herein can be directed towards any one or more processing units including, without limitation, CPUs, GPUs, DMA units, IPUs, NPUs, TPUs, NNPs, DPUs, VPUs, ASICs, FPGAs, and/or the like, in any combination. More generally, the techniques described herein can be applied to any CPU 102, auxiliary processors included in auxiliary processor subsystem 112, and/or any other processing unit in any combination. In addition, the techniques can be used with any one or more memory systems within the computing system 100, such as local memory, L1 cache memory 214, L1.5 cache memory, L2 cache memory 216, system level cache memory 122, system memory 104, and/or the like, in any combination.

Figure 3A:
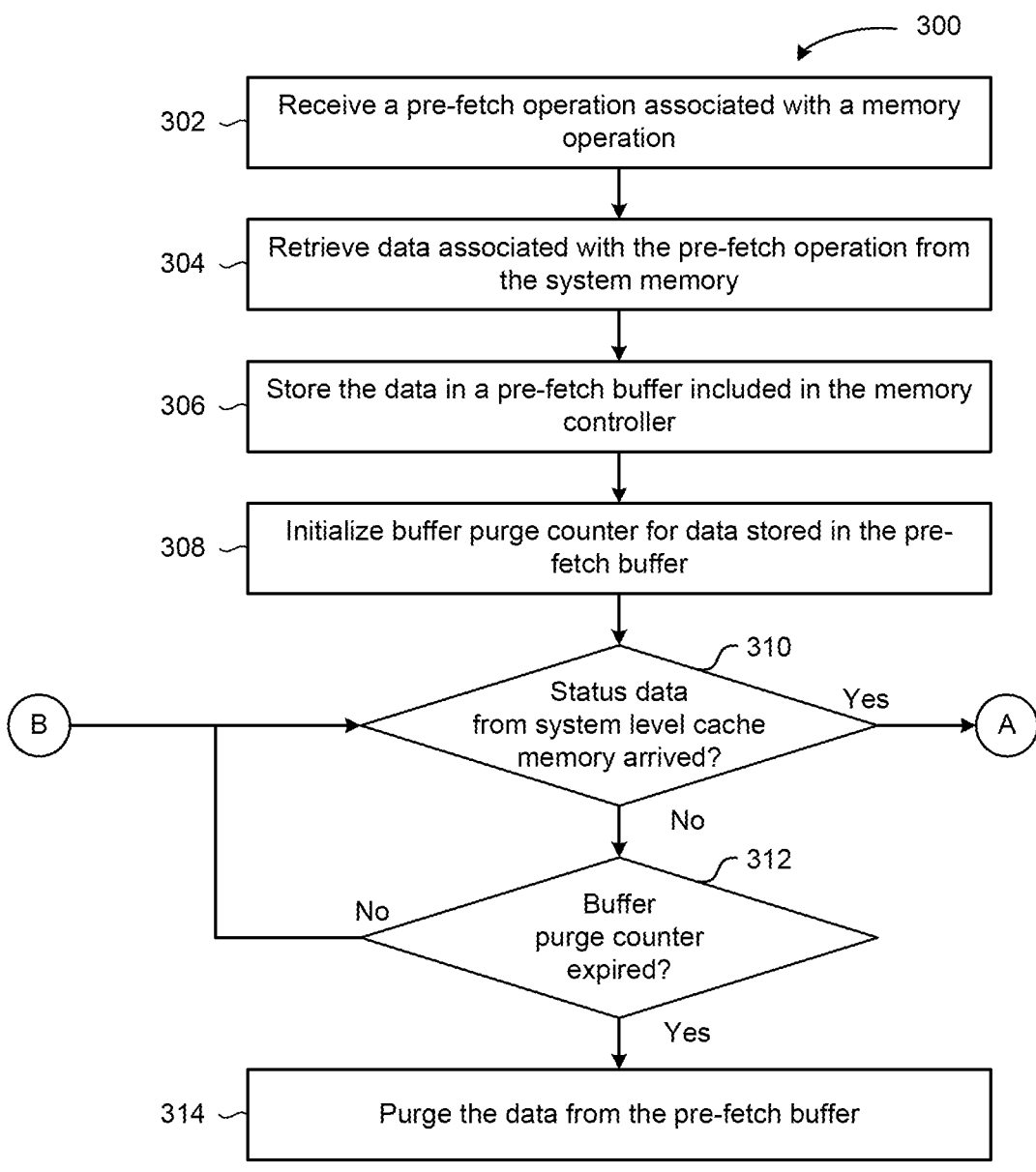
FIGS. 3A-3B set forth a flow diagram of method steps for managing a pre-fetch buffer in the pre-fetch system of FIG. 2, according to various embodiments.
Figure 3B:
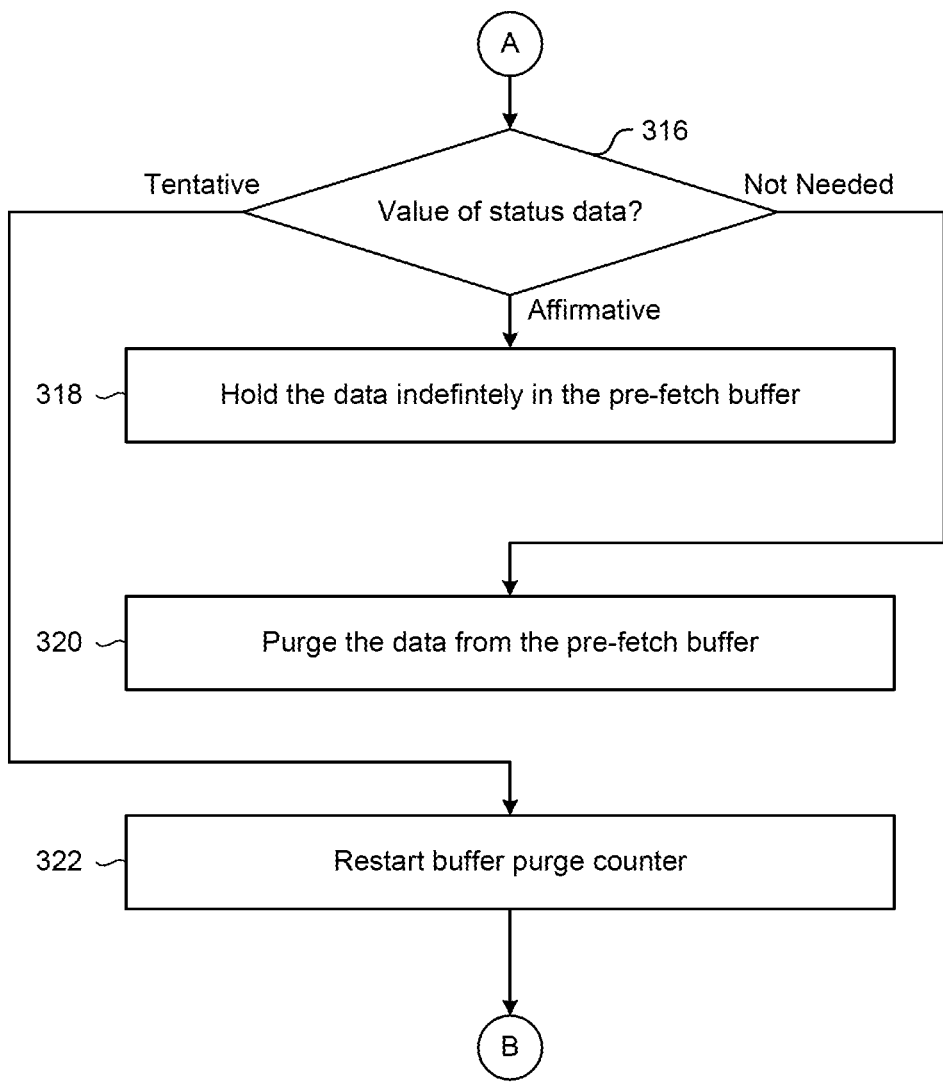

FIGS. 3A-3B set forth a flow diagram of method steps for managing a pre-fetch buffer 232 in the pre-fetch system 200 of FIG. 2, according to various embodiments. The method steps can be performed by CPU 102, auxiliary processor subsystem 112, and/or the like. Additionally or alternatively, the method steps can be performed by one or more processing units and/or alternative auxiliary processors including, without limitation, CPUs, GPUs, DMA units, IPUs, NPUs, TPUs, NNPs, DPUs, VPUs, ASICs, FPGAs, and/or the like, in any combination. Although the method steps are described in conjunction with the systems of FIGS. 1-3, persons of ordinary skill in the art will understand that any system configured to perform the method steps, in any order, is within the scope of the present disclosure.

As shown, a method 300 begins at step 302, where a memory controller, such as memory controller 230 of FIG. 2, receives a pre-fetch operation associated with a memory operation, such as a read operation or a write operation. Concurrent with processing units in core 212 issuing memory operations, pre-fetch generator 218 issues pre-fetch operations and transmits the pre-fetch operations to interconnect 220 using data path 252. The pre-fetch operations provide early indication of the data that is likely to be needed in the near future and, therefore, are likely to be requested by memory operations issued by processing units in core 212 in the near future. Pre-fetch generator 218 predicts the data that is likely to be needed based on various factors. An interconnect 220 receives the pre-fetch operations from pre-fetch generator 218 and transmits the pre-fetch operations to the memory controller using a data path, which is separate from the data path through which the memory operations are transmitted. As a result, the memory controller can receive pre-fetch operations from interconnect 220 prior to receiving corresponding memory operations from system level cache memory 122.

At step 304, the memory controller retrieves data associated with the pre-fetch operation from the system memory. When the memory controller receives a pre-fetch operation from interconnect 220, the memory controller pre-fetches the associated data from system memory 104.

At step 306, the memory controller stores the data in a pre-fetch buffer 232 included in the memory controller. In some examples, each entry in pre-fetch buffer 232 corresponds to a cache line in system level cache memory 122. Pre-fetch buffer 232 is a small, high-performance buffer memory that stores data that is most likely to be requested by a memory operation received from system level cache memory 122 in the near future.

At step 308, the memory controller initializes a buffer purge counter, referred to as a counter, for the data stored in the pre-fetch buffer 232. Pre-fetch buffer 232 includes a buffer purge counter for each entry stored in pre-fetch buffer 232. When storing pre-fetch data in pre-fetch buffer 232, the memory controller initializes, or resets, the corresponding counter. The counter measures an amount of time, referred to as a wait time, that the data stored in the corresponding entry has been resident in pre-fetch buffer. The counter can be initialized with a predetermined value and decremented periodically. The counter expires if the counter is decremented to zero. Alternatively, the counter can be initialized to zero and incremented periodically. The counter expires if the counter is incremented to a predetermined value. If the counter expires, and the data stored in the corresponding entry of pre-fetch buffer 232 has not yet been retrieved in response to a memory operation, then the memory controller can purge the data and clear the entry.

At step 310, the memory controller determines whether status data from system level cache memory 122 has arrived, where the status data corresponds to the entry stored in pre-fetch buffer 232 at step 306. If the status data has not arrived, then the method 300 proceeds to step 312, where the memory controller determines whether the buffer purge counter has expired. If the counter is decrementing, then the memory controller can determine whether the counter has decremented to zero. If the counter is incrementing, then the memory controller can determine whether the counter has incremented to the predetermined value. If the buffer purge counter has not expired, then the method 300 returns to step 310, where the memory controller continues to wait for status data and the counter continues to increment or decrement. If, however, the buffer purge counter has expired, then the method 300 proceeds to step 314, where the memory controller purges the data from pre-fetch buffer 232. In such cases, the counter has expired and the memory controller has not received any status data for the corresponding data. This situation can occur under various circumstances, such as when the memory controller receives a pre-fetch operation and does not receive any status data regarding the corresponding memory operation. Such examples can occur if pre-fetch generator 218 incorrectly predicted which cache lines would be needed by processing units included in core 212. Therefore, pre-fetch generator 218 issues pre-fetch operations for one or more cache lines, but the processing units included in core 212 do not issue corresponding memory operations. Correspondingly, system level cache memory 122 does not receive any corresponding memory operations before the counter expires. When the counter expires, the memory controller purges the data stored in the corresponding entry of pre-fetch buffer 232 and clears the entry. The method 300 then terminates.

Returning to step 310, if the status data has arrived, then the method 300 proceeds to step 316, where the memory controller determines that value of the status data. The memory controller receives status data from system level cache memory 122 that indicates a status of the memory operation. The status data provides early, live indication of memory operations being processed by system level cache memory 122, by other components upstream of system level cache memory 122, and/or by any other points of coherency included in pre-fetch system 200. The status data includes a memory address that identifies the location of data retrieved, or in the process of being retrieved, by a particular pre-fetch operation. This memory address further identifies the location of data that is potentially to be requested by a corresponding memory operation. The status data includes various status parameters that notify the memory controller of the progress of the corresponding memory operation. The memory controller uses the memory address included with the status data to identify a corresponding entry in pre-fetch buffer 232.

The status data further includes a value that represents various parameters associated with the memory operation for the corresponding memory address. The memory controller uses this value included in the status data to determine the likelihood that the data stored in the entry in pre-fetch buffer 232 operations is about to be requested by a memory operation received from system level cache memory 122. Based on the value included in the status data, the memory controller can purge data for an entry of pre-fetch buffer 232 before the corresponding counter expires or hold data for an entry of pre-fetch buffer 232 after the corresponding counter expires.

At step 316, the memory controller determines whether the value of the status indicates that the data stored in pre-fetch buffer 232 is tentatively needed by the memory controller, the data stored in pre-fetch buffer 232 is affirmatively needed by the memory controller, or the data stored pre-fetch buffer 232 is not needed by the memory controller.

If, at step 316, the value of the status indicates that the data stored in pre-fetch buffer 232 is tentatively needed by the memory controller, then the method proceeds to step 322 where the memory controller restarts the buffer purge counter. In such cases, the value of the status data indicates that a memory operation for the data has issued, but the pre-fetch system 200 has not yet determined whether the memory operation can be serviced by components upstream from the memory controller. Therefore, the memory operation is still anticipated to arrive at the memory controller. For example, if the status data indicates that a memory operation has arrived at system level cache memory 122 or other point of coherency, then the memory controller can determine that the processing unit has issued a memory operation. Similarly, if the status data indicates that a memory operation is being retried at system level cache memory 122 or other point of coherency, then the memory controller can also determine that the processing unit has issued a memory operation. In either case, the memory controller does not yet have sufficient data to determine whether the memory operation is going to be serviced by the memory controller or by another cache memory in pre-fetch system 200. The memory controller restarts the buffer purge counter by resetting the counter for the entry in pre-fetch buffer 232 corresponding to the cache line to the ceiling value. Restarting the counter causes the counter to begin counting from the ceiling value, thereby causing the entry to be retained for a longer duration, pending the possibility that system level cache memory 122 could transmit the memory operation to the memory controller. The method 300 then proceeds to step 310 where the memory controller continues to wait for status data and the counter begins to increment or decrement from the ceiling value.

If, at step 316, the value of the status indicates that the data stored in pre-fetch buffer 232 is affirmatively needed by the memory controller, then the method proceeds to step 318, where the memory controller holds the data indefinitely in pre-fetch buffer 232. In such cases, the value of the status data indicates that a memory operation for the data has issued, and the pre-fetch system 200 has determined that the memory operation cannot be serviced by components upstream from the memory controller. Therefore, the memory operation is going to arrive at the memory controller. For example, if the status data indicates that a memory operation has arrived at system level cache memory 122 or other point of coherency, and that the requested data is not stored in level 1 cache memory 214, level 2 cache memory 216, system level cache memory 122, or other cache memory, then the memory controller determines that the data for the memory operation is stored in system memory 104. The memory controller sets the counter for the entry in pre-fetch buffer 232 to a static value in order to hold the current counter value without further incrementing or decrementing the counter. As a result, the memory controller causes the entry to be retained or kept indefinitely, pending the system level cache memory 122 transmitting the memory operation to the memory controller. The method 300 then terminates.

If, at step 316, the value of the status indicates that the data stored in pre-fetch buffer 232 is not needed by the memory controller, then the method proceeds to step 320, where the memory controller purges the data from pre-fetch buffer 232. In such cases, the value of the status data indicates that a memory operation for the data has issued, and the pre-fetch system 200 has determined that the memory operation can be serviced by components upstream from the memory controller. Therefore, the memory operation is not going to arrive at the memory controller. For example, if the status data indicates that a memory operation has arrived at system level cache memory 122 or other point of coherency, and that the requested data is stored in level 1 cache memory 214, level 2 cache memory 216, system level cache memory 122, or other cache memory, then the memory controller determines that the memory operation is going to be serviced upstream from the memory controller. The other cache memory can be any coherent cache memory, including level 1 cache memory 214, level 2 cache memory 216, a level 1 or level 2 cache memory associated with a different processing unit, and/or the like. In such cases, the memory controller determines that system level cache memory 122 is not going to transmit the memory operation to the memory controller. Therefore, the data in the corresponding entry of pre-fetch buffer 232 is not needed. The memory controller sets the counter for the entry in pre-fetch buffer 232 to the floor value, indicating that the counter has expired. As a result, the memory controller causes the entry to be purged. The method 300 then terminates.

In sum, various embodiments include techniques for managing pre-fetch data in a computing system. With the disclosed techniques, a memory controller receives early, live status data indicating the status of memory operations likely to be issued by one or more processing units. The status data does not pass through the same pipeline as the subsequent read operation when the read operation is transmitted to the memory controller. Instead, the status data is routed from the system level cache memory or other point of coherency to the memory controller via one or more side band signals. These side band signals have a latency of a small number of clock cycles, such as one clock cycle, between when the system level cache memory or other point of coherency detects a change in status and when the memory controller receives the status data.

The status data indicates status regarding the likelihood of such read operations arriving at the memory controller and the processing of the read operations by the system level cache memory. Additionally or alternatively, the status indicates status regarding the processing of the read operations by another point of coherency, such as a component that is upstream relative to the system level cache memory. The memory controller utilizes the status data to efficiently purge pre-fetch data from or hold pre-fetch data in the pre-fetch buffer. The status data indicates when a read operation for a given cache line has arrived at the system level cache memory or other point of coherency. The status data further indicates if a read operation is being retried at the system level cache memory or other point of coherency. The status data further indicates if a read operation is issued by the processing unit and the corresponding cache line is stored in the system level cache memory or other cache memory in a dirty state. In such cases, the read operation is serviced by the system level cache memory or other cache memory and does not arrive at the memory controller. The status data further indicates if a read operation is issued by the processing unit and the corresponding cache line is stored in the system level cache memory or other cache memory in a clean state. In such cases, depending on the behavior and cache policy of the system level cache memory or other cache memory, the memory controller can determine whether or not to purge the data stored in the pre-fetch buffer.

At least one technical advantage of the disclosed techniques relative to the prior art is that, with the disclosed techniques, a memory controller manages data stored in a pre-fetch buffer using early live indications in the form of status data received from a system level cache memory or other point of coherency. The memory controller uses these indications in addition to pre-fetch operations received from a pre-fetch generator. As a result, the memory controller can purge data stored in the pre-fetch buffer earlier when the indications indicate that the read operation can be serviced by a local cache memory or system level cache memory. The memory controller can hold data stored in the pre-fetch buffer longer when the indications indicate that the read operation is delayed and/or cannot be serviced by a local cache memory or system level cache memory. Therefore, the pre-fetch buffer can purge data sooner when the data is not needed and hold data longer when the data is needed, relative to prior approaches. As a result, the memory controller manages the pre-fetch buffer more efficiently and the memory system achieves higher performance relative to prior techniques. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for managing pre-fetch data in a computing system, the method comprising:
   receiving, from an interconnect via a first data path, a pre-fetch operation to retrieve data requested by a memory operation;
   retrieving the data requested by the memory operation from a system memory;
   storing the data requested by the memory operation in a pre-fetch buffer;
   receiving status data from a cache memory via a second data path that couples the cache memory with a memory controller, wherein the status data includes one or more parameters indicating progress of the memory operation; and
   purging the data requested by the memory operation from the pre-fetch buffer or holding the data requested by the memory operation in the pre-fetch buffer based on the status data.

2. The computer-implemented method of claim 1, wherein the status data indicates that the memory operation is anticipated to be arriving, and wherein holding the data in the pre-fetch buffer based on the status data comprises resetting a purge timer to an initial value to increase a time that the data is held in the pre-fetch buffer.

3. The computer-implemented method of claim 2, wherein the status data indicates that the memory operation has arrived at the cache memory.

4. The computer-implemented method of claim 2, wherein the status data indicates that the memory operation is being retried at the cache memory.

5. The computer-implemented method of claim 1, wherein the status data indicates that the memory operation is going to be arriving, and wherein holding the data in the pre-fetch buffer based on the status data comprises holding a purge timer at a static value to keep the data in the pre-fetch buffer indefinitely.

6. The computer-implemented method of claim 5, wherein the status data indicates that data associated with the memory operation is not stored in the cache memory.

7. The computer-implemented method of claim 1, wherein the status data indicates that the memory operation is not going to be arriving, and wherein purging the data in the pre-fetch buffer based on the status data comprises resetting a purge timer to an expiration value to purge the data from the pre-fetch buffer.

8. The computer-implemented method of claim 7, wherein the status data indicates that data associated with the memory operation is stored in the cache memory.

9. The computer-implemented method of claim 1, wherein the data associated with the memory operation is received via a third data path.

10. A system, comprising:
    a system memory;
    a cache memory;
    an interconnect;

a processor that is coupled to the cache memory and includes a pre-fetch generator; and a memory controller that is coupled to the cache memory, the interconnect, and the processor, and that:

receives, from the interconnect via a first data path, a pre-fetch operation to retrieve data requested by a memory operation, retrieves the data requested by the memory operation from a system memory, stores the data requested by the memory operation in a pre-fetch buffer, receives status data from the cache memory via a second data path that couples the cache memory with the memory controller, wherein the status data includes one or more parameters indicating progress of the memory operation, and purges the data requested by the memory operation from the pre-fetch buffer or holds the data requested by the memory operation in the pre-fetch buffer based on the status data.

11. The system of claim 10, wherein the status data indicates that the memory operation is anticipated to be arriving, and wherein to hold the data in the pre-fetch buffer based on the status data, the memory controller resets a purge timer to an initial value to increase a time that the data is held in the pre-fetch buffer.

12. The system of claim 11, wherein the status data indicates that the memory operation has arrived at the cache memory.

13. The system of claim 11, wherein the status data indicates that the memory operation is being retried at the cache memory.

14. The system of claim 10, wherein the status data indicates that the memory operation is going to be arriving, and wherein to hold the data in the pre-fetch buffer based on the status data, the memory controller holds a purge timer at a static value to keep the data in the pre-fetch buffer indefinitely.

15. The system of claim 14, wherein the status data indicates that data associated with the memory operation is not stored in the cache memory.

16. The system of claim 10, wherein the status data indicates that the memory operation is not going to be arriving, and wherein to purge the data in the pre-fetch buffer based on the status data, the memory controller resets a purge timer to an expiration value to purge the data from the pre-fetch buffer.

17. The system of claim 16, wherein the status data indicates that data associated with the memory operation is stored in the cache memory.

18. The system of claim 10, wherein the data associated with the memory operation is received via a third data path.

\* \* \* \* \*